US007266091B2

(12) United States Patent
Singh et al.

(10) Patent No.: US 7,266,091 B2
(45) Date of Patent: Sep. 4, 2007

(54) SYSTEM AND METHOD FOR CONFERENCING IN INTER/INTRANET TELEPHONY

(75) Inventors: Kundan Singh, New York, NY (US); Gautam Nair, New York, NY (US); Henning Schulzrinne, New York, NY (US)

(73) Assignee: The Trustees of Columbia University in City of New York, New York, NY (US)

( * ) Notice: Subject to any disclaimer, the term of this patent is extended or adjusted under 35 U.S.C. 154(b) by 1029 days.

(21) Appl. No.: 10/085,837

(22) Filed: Feb. 28, 2002

(65) Prior Publication Data

US 2002/0126626 A1 Sep. 12, 2002

Related U.S. Application Data

(60) Provisional application No. 60/280,783, filed on Apr. 2, 2001, provisional application No. 60/272,201, filed on Feb. 28, 2001.

(51) Int. Cl.
*H04L 12/18* (2006.01)
*H04Q 11/00* (2006.01)
(52) U.S. Cl. ................ 370/260; 370/352; 370/465
(58) Field of Classification Search ........ 370/260–261, 370/352–356, 401, 465, 466
See application file for complete search history.

(56) References Cited

U.S. PATENT DOCUMENTS

| | | | |
|---|---|---|---|
| 6,011,579 A | 1/2000 | Newlin | |
| 6,075,796 A | 6/2000 | Katseff et al. | |
| 6,434,143 B1 | 8/2002 | Donovan | |
| 6,529,501 B1 | 3/2003 | Zhao et al. | |
| 6,597,686 B1 | 7/2003 | Smyk | |
| 6,690,663 B1 | 2/2004 | Culver | |
| 6,763,020 B1 | 7/2004 | Hon | |

(Continued)

OTHER PUBLICATIONS

Kelly Carroll, "Internet Boosts Unified Messaging: Wireless Carriers Turn to Web-Based Systems," Telephony Online, Apr. 24, 2000.

(Continued)

*Primary Examiner*—Chi Pham
*Assistant Examiner*—Saba Tsegaye
(74) *Attorney, Agent, or Firm*—Baker Botts LLP

(57) ABSTRACT

A conferencing server is provided for a data network telephony system for facilitating multi-party call conferencing. The conferencing server generally includes a session initiation protocol (SIP) signaling interface and a media conferencing module. The media conferencing module includes a number of selectable media decoders compliant with known media CODEC protocols, such as G.711. A number of media stream queues s are selectively coupled to the media decoders for storing the decoded incoming media streams. A jitter correction processor is provided to compensate for arrival time jitter in the data stored in the media stream queues. A mixer, which receives the jitter corrected data from each of the queues, generates an aggregate conferencing stream of all active participants and generates individual participant conference streams for each active participant in the conference. A number of selectable media encoders are then used to encode the individual participant conference streams in accordance with a media CODEC protocol supported by the respective participant. The encoded participant conference streams are then distributed to the various conference participants via the data network, such as the Internet.

12 Claims, 6 Drawing Sheets

U.S. PATENT DOCUMENTS

| | | | |
|---|---|---|---|
| 6,850,496 B1* | 2/2005 | Knappe et al. | 370/260 |
| 7,006,616 B1* | 2/2006 | Christofferson et al. | 379/202.01 |
| 2002/0123895 A1* | 9/2002 | Potekhin et al. | 704/275 |
| 2004/0042607 A1* | 3/2004 | Gallant et al. | 379/220.01 |
| 2004/0246949 A1* | 12/2004 | Cannon | 370/352 |
| 2005/0025073 A1* | 2/2005 | Kwan | 370/260 |

OTHER PUBLICATIONS

"'Killer App' Is On The Loose: Unified Messaging Is A Key Service Enabled By The Next-Generation Network," Communication News, Jan. 2000.

Leonard Chong et al., "Towards a Unified Messaging Environment Over the Internet," Cybernetics and Systems, Sep. 1999.

Brian Quinton, "Microsoft, Sprint Offer Unified Messaging Product," Telephony Online, Jun. 14, 1999.

Richard Tarabour et al., "Manageable Messages," Telephony Online, Jun. 7, 1999.

Peter Wilson, "Packet Network Proof," Telephony Online, Mar. 22, 1999.

R. Babbage et al., "Internet Phone—Changing the Telephony Paradigm," Internet and Beyond 231 (eds. S. Sim & J. Davies, 1998).

Susan Biagi, "IP Networks Now and Forever: Carriers Must Bridge Packet, Circuit-Switched Networks," Telephony Online, Oct. 12, 1998.

* cited by examiner

A-D support G.711; E and F support GSM.

SYSTEM AND METHOD FOR CONFERENCING IN INTER/INTRANET TELEPHONY

This application claims the benefit of U. S. Provisional Applications, Ser. No. 60/272,201, entitled INTERNET TELEPHONY BASED ON SESSION INITIATION PROTOCOL, which was filed on Feb. 28, 2001, and 60/280,783, entitled CENTRALIZED CONFERENCING USING SESSION INITIATION PROTOCOL, which was filed on Apr. 2, 2001, the disclosures of which are hereby incorporated by reference in their entirety.

A computer program listing appendix is submitted herewith in duplicate compact disks comprising thirty eight computer readable (IBM Compatible, Microsoft Windows) files. The applicant reserves all copyrights in such computer listings, however, reproduction of these files in connection with this application is expressly permitted. The content of the attached computer program listing appendix is incorporated herein by reference in its entirety.

FIELD OF THE INVENTION

The present invention relates generally to the field of Internet and intranet telephony and more particularly relates to a network telecommunications system for performing multi-party call conferencing.

BACKGROUND OF THE INVENTION

The Internet has evolved into an essential communication tool for millions of users in the business, technical and educational fields. In this regard, a growing use of the Internet relates to Internet telephony which provides a number of advantages over conventional circuit-switched network telephony systems that are controlled by a separate signaling network.

An important feature in most modem telephony systems is multi-party conferencing. Multi-party conferencing can range from simple three party calls to multi-casts involving thousands of participants. Internet telephony systems generally use either the H.323 signaling protocol or the session initiation protocol (SIP) for signaling and call control functions. In the case of H.323, this protocol includes a defined multipoint control unit (MCU) for handling multi-party conferences. Although SIP supports various multi-party conferencing models, there is no rigid definition for a conferencing entity in SIP. In addition, as the H.323 protocol and SIP continue to compete in the market place, it will be increasingly important to provide systems which can effectively establish conferences among users whose equipment is compliant with only one of these two signaling protocols.

The session initiation protocol (SIP) is gaining in popularity as a standard signaling protocol for use in Internet telephony. As this popularity grows, it will be increasingly desirable to provide a system architecture and method for providing improved conferencing services in SIP based systems.

SUMMARY OF THE INVENTION

It is an object of the present invention to provide improved systems and methods for multi-party call conferencing in a SIP compliant telephony system.

In accordance with the present invention, a network telephony system is provided which enables multi-party conferencing services. The system generally includes a data network, a number of user agents operatively coupled to the data network and a conferencing server operatively coupled to the data network. The user agents are telephony endpoints, such as standalone Internet telephony appliances or personal computers with appropriate telephony software. The central conferencing server receives media streams from a number of user agents which are to be conference participants, decodes the media streams, queues the decoded audio data from each party, applies jitter correction to the respective decoded audio data, performs audio mixing, encodes the data and distributes the mixed audio stream to the conference participants. The mixing process is preferably performed such that each participant receives the aggregate mixed audio less the participant's own audio component.

A conferencing server for establishing multi-party call conference services in a data network telephony system in accordance with the present invention includes a session initiation protocol (SIP) signaling interface and a media conferencing module. The media conferencing module includes a plurality of selectable media decoders, a plurality of media stream queues selectively coupled to the media decoders, and a jitter correction processor. The jitter correction processor compensates for arrival time jitter in the data stored in the media stream queues. A mixer is provided in the media conferencing module to receive the jitter corrected data from each of the queues and generate an aggregate conferencing stream of all active participants and also to generate individual participant conference streams for each active participant in the conference. A number of selectable media encoders are provided to encode the participant conference streams in accordance with a protocol supported by the respective participants.

The individual participant conference streams are preferably formed by subtracting the participant's own audio contribution from the aggregate conferencing stream.

The selectable media decoders are generally arranged to decode one of a number of known media CODEC protocols. It is preferable for the particular CODEC protocol selected to be determined by the media conferencing module in response to a SIP INVITE request message from the participant. When a number of inactive participants, i.e., listeners, share a common media CODEC protocol, a single media encoder can be used to encode the aggregate media stream prior to distribution to those inactive participants. Thus it is preferred for the conferencing server to determine the minimum set of media CODEC protocols supported by the inactive participants and encode the aggregate media streams accordingly.

To enable conferencing with a wide variety of telephony endpoints, it is desirable for the conferencing server to include a SIP to H.323 signaling protocol gateway interface and/or a SIP to PSTN signaling protocol gateway interface, each coupled to the media conferencing module.

The present method of conferencing a number of conference participant audio streams includes identifying at least one media CODEC protocol for each conference participant, decoding each audio stream in accordance with a corresponding identified CODEC protocol, compensating each decoded audio stream for arrival time jitter and mixing each of the audio streams into an aggregate audio stream. For each active participant, that participant's audio stream is subtracted from the aggregate audio stream to generate a corresponding participant conference stream. The participant conference streams are then encoded in accordance with an identified CODEC protocol for the participant and the encoded participant conference streams are delivered to the corresponding participants.

Preferably, the method also includes identifying a minimum set of CODEC protocol's for the inactive participant's in the conference and for each CODEC protocol in the minimum set of CODEC protocols, encoding the aggregate audio stream in accordance with the selected protocol prior to distributing the encoded aggregate audio stream to those inactive participant's supporting the respective CODEC protocol.

The methods of the present invention are generally performed on a general purpose computer which is configured by suitable software stored or transported on computer readable media.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein.

DETAILED DESCRIPTION OF THE INVENTION

Figure 1:
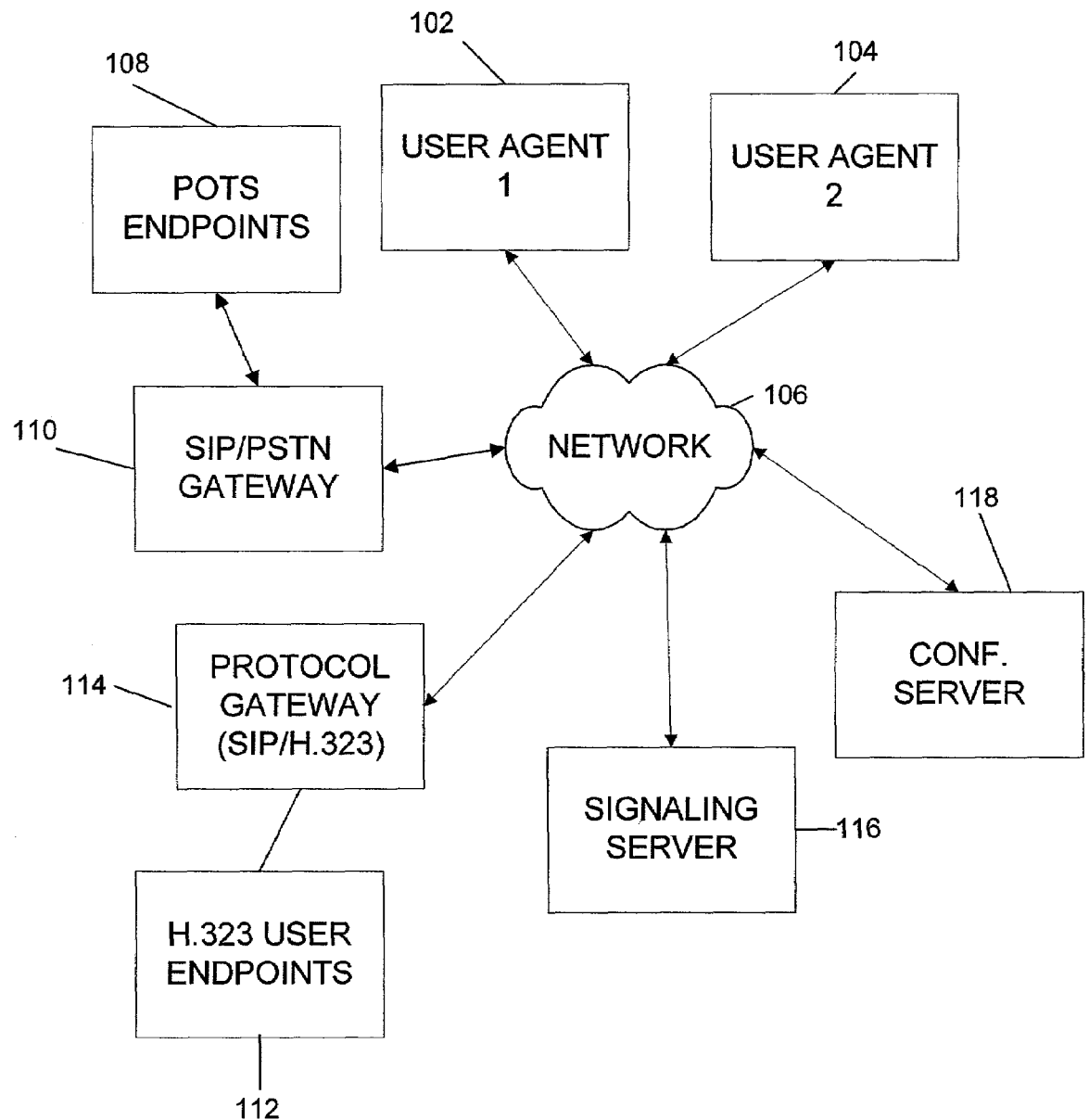
FIG. 1 is a block diagram of a system for providing conferencing services in a telephony system employing the session initiation protocol (SIP)

FIG. 1 is a simplified block diagram illustrating the architecture of the present system for performing conferencing services in connection with an Internet telephony system. The present system employs a centralized conferencing model wherein a conferencing server receives media streams from each of a number of conference participants, mixes the streams as required and then distributes the appropriate mixed streams to each of the conference participants.

The system of FIG. 1 preferably operates primarily in accordance with the session initiation protocol (SIP) for signaling and control functions. In addition, it is preferable for the system to include provisions for accommodating other signaling protocols to provide for conferencing among various forms of telephony endpoints. Media being transported in a network telephony system generally includes audio, video, text, graphics and other data which can be transmitted via packet data. In data network telephony systems, media is generally transported using the real time protocol (RTP), which is known in the art.

The system will generally include a large number of telephony endpoints, which preferably take the form of SIP user agents. For illustrative purposes, only two such user agents 102, 104 are illustrated. The user agents 102, 104 can take on many forms, such as stand alone SIP telephony devices, which are available from a number of sources or SIP client software operating on a conventional personal computer, such as the SIPC software available for license from Columbia University, New York, N.Y. Suitable SIP user agents are described in international patent publication WO 00/76158 entitled "Network Telephony Appliance and System for Inter/Intranet Telephony" published on Dec. 14, 2000, which is hereby incorporated by reference in its entirety.

The SIP user agents 102, 104 are coupled to a data network 106, such as an Ethernet network. The network can also be the Internet with user agents grouped under one or more Internet domains. The user agents 102, 104 can access one another directly via network 106 (internally, peer-to-peer), or externally from another Internet domain. SIP user agents 102, 104 can also access non-SIP based telephony endpoints, such as conventional telephones (POTS endpoints 108) via a SIP/PSTN gateway 110 or H.323 based Internet telephony endpoints 112 via a SIP/H.323 protocol gateway 114.

SIP user agents are capable of direct point-to-point call sessions. However, the system can also include a signaling server 116 which responds to call requests from a SIP user agent 102, 104 and identifies the location of the called party. Preferably, the signaling server 116 is a SIP server which can perform proxy and redirect signaling operations. In SIP, each telephony endpoint can be referred to as a node and has a specific SIP address. By employing this specific address, any node acting as a calling party can directly initiate a call session with any other node on the network. The signaling server 108 can be accessed by the various user agents 102, 104 on the network to provide enhanced services, such as a directory service, call forwarding, call branching, call messaging and the like. For example, a calling party wishing to initiate a call to JOHN SMITH can enter the SIP address for that person if it is known, such as sip:john.smith@work.com. If, on the other hand, the calling party does not know the SIP address of the party, the calling party can contact the signaling server 108 with a request to begin a session with JOHN SMITH.

The signaling server 116 generally includes databases with registration information for various parties and can return the SIP address to the calling party or forward the call request to the proper SIP address of the called party. In addition, the called party may have multiple SIP addresses such as john.smith@home, john.smith@office, john.smith@lab and the like. The signaling server can provide a session initiation signal to each of these addresses and establish a connection between the calling party and the first contacted node that responds to the initiation request. Similarly, parties can periodically register with the redirect server to indicate the current SIP address where they can be contacted (call forwarding feature). In general, when a call is initiated, the signaling server 116 either proxies, redirects or rejects the call initiation message. Signaling servers 116, such as SIP proxy servers are known. A suitable SIP proxy server can be implemented using the SIPD software available from Columbia University, New York, N.Y.

The system 100 also includes conferencing server 118 which is coupled to the signaling server 116, user agents 102, 104 and gateways 110, 114 via the data network 106. The conferencing server 118 will establish call sessions with each of a number of conference participants, receive media streams from such participants and then mix and distribute the media streams as appropriate to enable the conferencing functions. While shown in FIG. 1 as separate operational blocks, the gateways 110, 114, signaling server 116 and conferencing server 118 can be integrated into a single server/gateway unit or distributed throughout the system in various hardware topologies. Whether such functionality is consolidated or distributed is not critical to the present invention.

The conferencing server 118 is a centralized conferencing server which receives media streams from a number of conference participants, decodes the media streams, mixes the audio component of the media streams and encodes and distributes mixed streams to the conference participants. Preferably, the conferencing server is capable of directly conferencing endpoints which employ different signaling protocols, such as H.323 and SIP, as well as different media CODEC protocols such as G.711, DVI ADPCM, GSM and the like. The media streams are generally conveyed using the real time transport protocol (RTP) in both H.323 and SIP.

Figure 2:
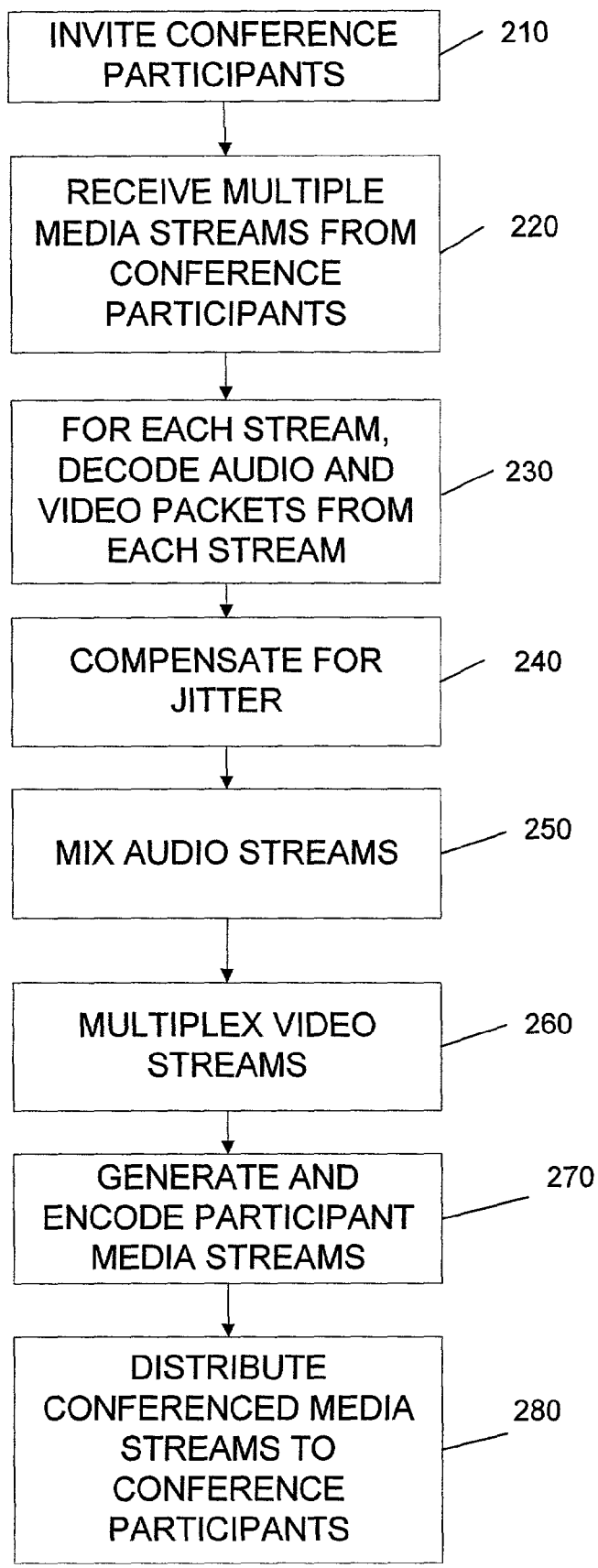
FIG. 2 is a flow chart illustrating an overview of a centralized conferencing method in accordance with the present invention.

FIG. 2 is a simplified flow chart illustrating the operation of the centralized conferencing server. Conference participants are generally brought into a conference via a SIP INVITE request (step 210). Among other things, the SIP INVITE request will identify the participant and also provide information to the server regarding those media CODEC protocols supported by the participant. Using this information, the centralized conferencing server 118 can select an appropriate CODEC for each participant. During the conference, media streams are received from each participant (step 220).

Each media stream can include audio, video and other media data. For each participant stream, an appropriate decoder is selected and applied by the conferencing server (step 230). The decoded audio data for each participant is stored in a queue, such as a first in, first out (FIFO) memory structure. Jitter compensation is then applied to each of the decoded audio streams and the individual streams are then mixed into a common audio stream (250).

In the case where the media includes a video component, the video components are not generally mixed, as the composite video would not be meaningful. In this case, the video components can be replicated and multiplexed (step 260) with the outgoing audio. In the case of multiple party video, each participant having a suitably enable user agent device can select which other participant's video should be displayed in one or more display windows at the user's endpoint device. Prior to distributing the mixed audio, it is preferable to remove the participant's own audio contribution from the common audio stream being delivered to that participant. The media streams for each participant are then encoded in accordance with a suitable media encoding protocol (step 270) and the conferenced media streams are distributed over the data network to the conference participants (step 280).

Figure 3:
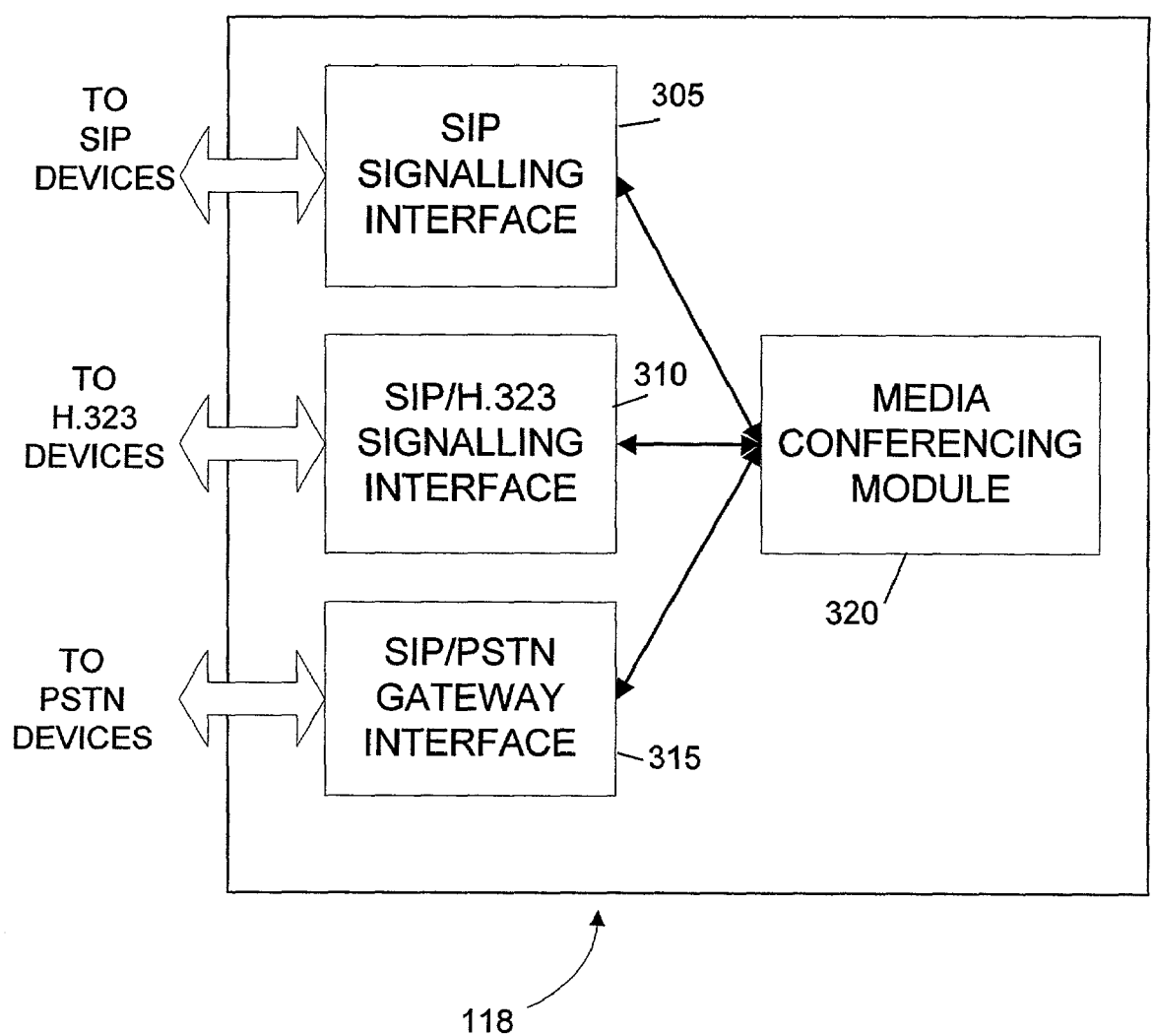
FIG. 3 is a simplified functional block diagram of a conferencing server in accordance with the present invention.

As illustrated in the simplified block diagram of FIG. 3, the conferencing server 118 will generally include a SIP signaling interface 305, an H.323 signaling interface 310 and a SIP/PSTN gateway interface 315 which are each coupled to a media conferencing module 320. In the event that the system is intended only for use with SIP user agents, the H.323 signaling interface 310 and SIP/PSTN gateway interface 315 are not required. The architecture and operation of the media conferencing module 320 of the conferencing server 118 is further illustrated in FIGS. 4-6.

Figure 4:
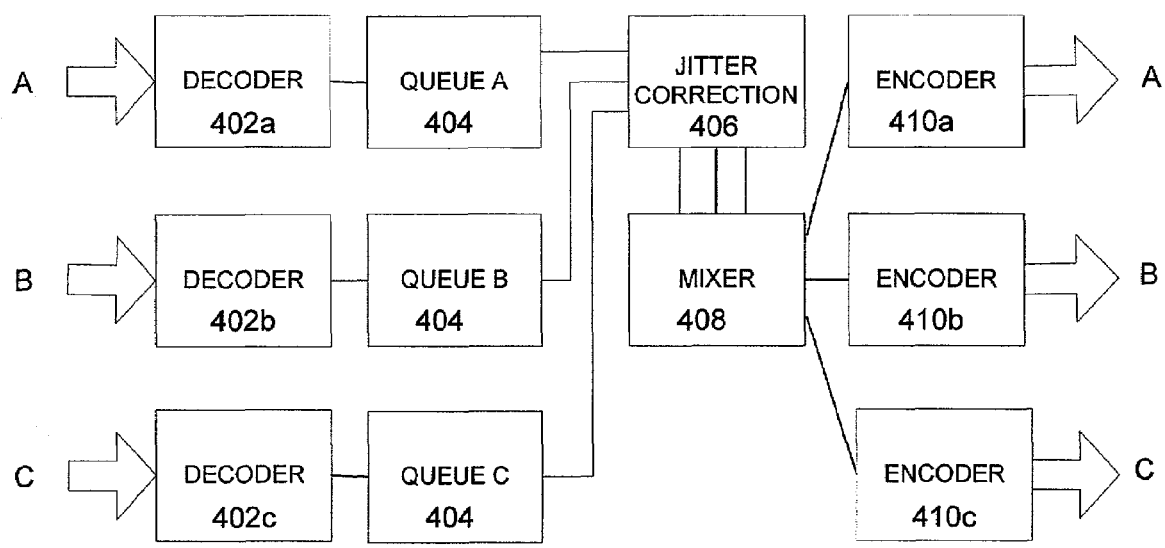
FIG. 4 is simplified functional block diagram of a media conferencing module for a conferencing server in accordance with the present invention.

FIG. 4 is a simplified operational block diagram of an embodiment of the media conferencing module 320 for a case with three conference participants, A, B, C. Media streams are generally received by the conferencing server 118 over a network, such as the Internet, in the form of packetized, compressed audio data in compliance with one of several media CODEC protocols such as G.711, DVI ADPCM, GSM and the like. When a participant can support multiple CODEC protocols, these will generally be identified in a SIP INVITE request which is performed at the initiation of a conference or when a new participant joins an ongoing conference. Generally, the incoming packetized media data includes a header with data identifying the protocol of the media data. Based on the protocol of the media data, a decoder 402 corresponding to that media stream will be selected or configured to decode the received audio data. The decoded data is in the form of decompressed linear audio samples which are sequentially stored in a corresponding data queue 404 along with an RTP time stamp.

Because of the nature of data transmission via the Internet and other like packet data networks, temporal jitter will be encountered in the arrival time of the media streams. Accordingly, a jitter correction processing operation 406 is required. Jitter correction can take the form of a dynamic play-out delay algorithm, such as that described in "Adaptive play-out mechanisms for packetized audio applications in wide-area networks," by R. Ramjee et al., Proceedings of the Conference on Computer Communications (IEEE Infocom), pp 680-688, IEEE Computer Society Press, June 1994, the disclosure of which is hereby incorporated by reference in its entirety.

After jitter correction is performed, the incoming media streams are combined by a mixer 408. Audio mixing can be accomplished by simple addition of the linear audio samples in each temporally corresponding queue entry to derive a mixed linear stream. It is undesirable for a conference participant to receive his or her own audio in the mixed audio stream. Accordingly, the mixer 408 subtracts out each participants audio component from the mixed stream to generate a participant specific mixed stream. Thus, participant A would receive a stream including the audio from participants B and C, but not her own audio. Similarly, B will receive a mixed audio stream of A+C and C will receive a mixed audio stream, A+B. The individual mixed streams are then passed to encoders 410a, 410b, 410c which encode the mixed streams in accordance with a media protocol supported by the particular participant.

Figure 5:
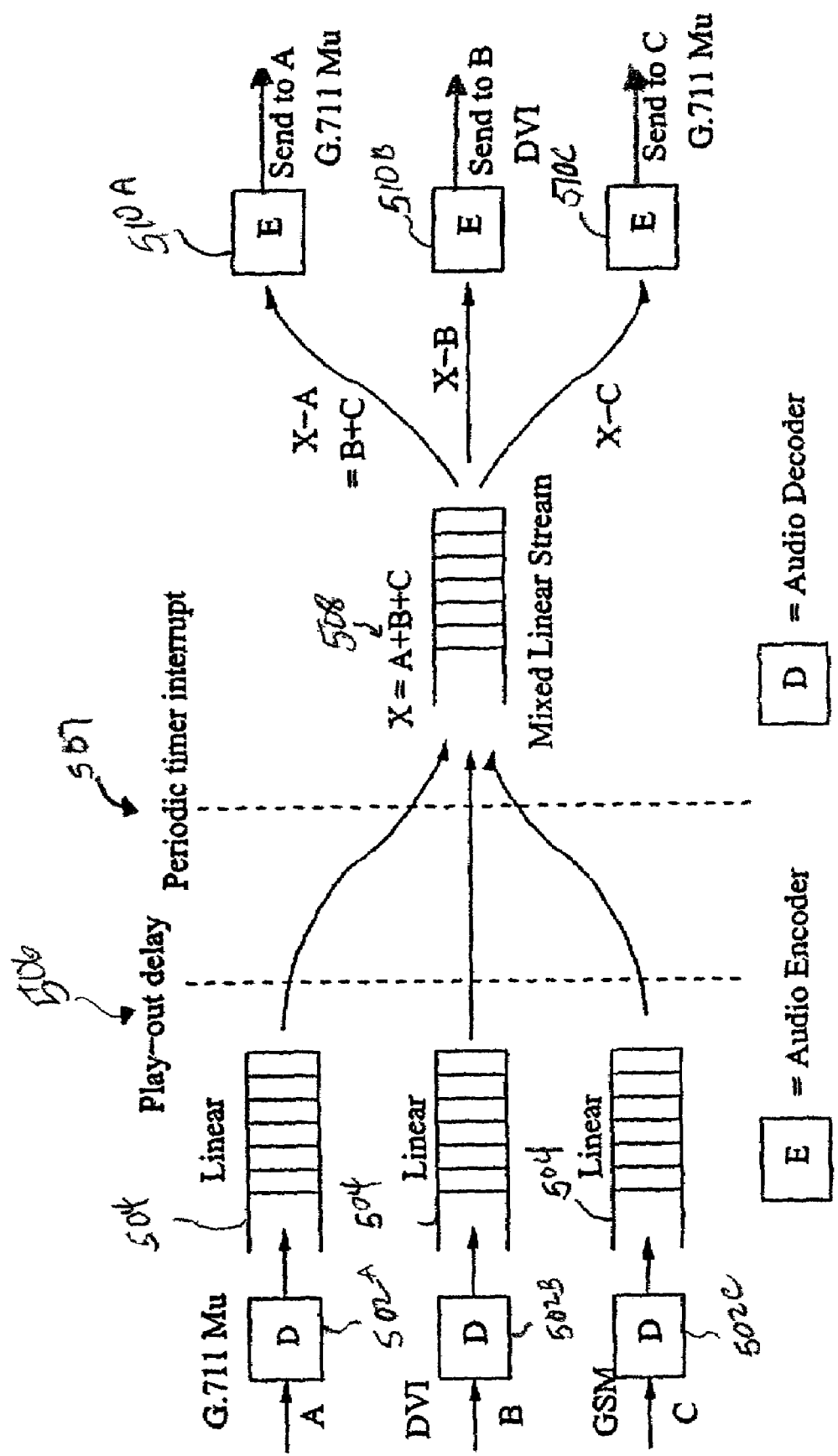
FIG. 5 is a flow diagram illustrating the operation of the media conferencing module of FIG. 4.

FIG. 5 is a pictorial diagram which further illustrates an example of the operation of the media conferencing module 320. In the example of FIG. 5, there are three conference participants A, B and C. In this example, it is assumed that participant A supports G.711 Mu, participant B supports DVI, and participant C supports both GSM and the G.711 Mu CODEC protocols. This information is conveyed to conferencing server 118 by each participant endpoint in the form of a SIP INVITE request. The intersection of CODEC protocols for these participants is G.711 Mu (A and C) and DVI (B). Thus, only these two encoders need to be utilized by the conferencing server 118.

As the encoded and compressed audio packets are received from each active conference participant, an appropriate decoder is used to extract linear audio samples corresponding to the actual audio content. For example, for participant A, decoder 502A is selected as a G.711 Mu CODEC, whereas for participant B, a DVI CODEC is applied and for participant C a GSM CODEC is used. As the individual audio streams are decoded, the linear audio samples are stored in a corresponding queue 504 along with an RTP time stamp. A play-out delay algorithm is then applied to the data in each of the participant queues in order to compensate for arrival time jitter in each stream. A system timer 507 in the conferencing server 118 periodically strobes the data from the individual participant queues into the mixer 508 which generates a mixed linear stream having all of the participants audio aggregated into a common stream, X. This can be performed by adding the values of each corresponding linear audio sample.

If there are participants who are inactive, i.e., only listening not contributing to the audio stream, the common stream, X, can be encoded and distributed to those listeners in accordance with the particular CODEC protocols. However, for those participants which are active speakers, the mixer 408 extracts the participants own audio component from the common stream before encoding and sending the stream to the participant. For example, participant A will receive the composite audio of X–A which in this case is equal to the composite audio of B+C. This can be performed by simply subtracting the value of the samples in the queue for participant A from those of corresponding values in the queue for stream X. The composite audio X-A is then provided to a G.711 Mu encoder 410A and the encoded stream is provided to participant A via the data network 106. Similarly, encoders 510B and 510C receive and encode the streams for participants B and C, respectively.

Figure 6:
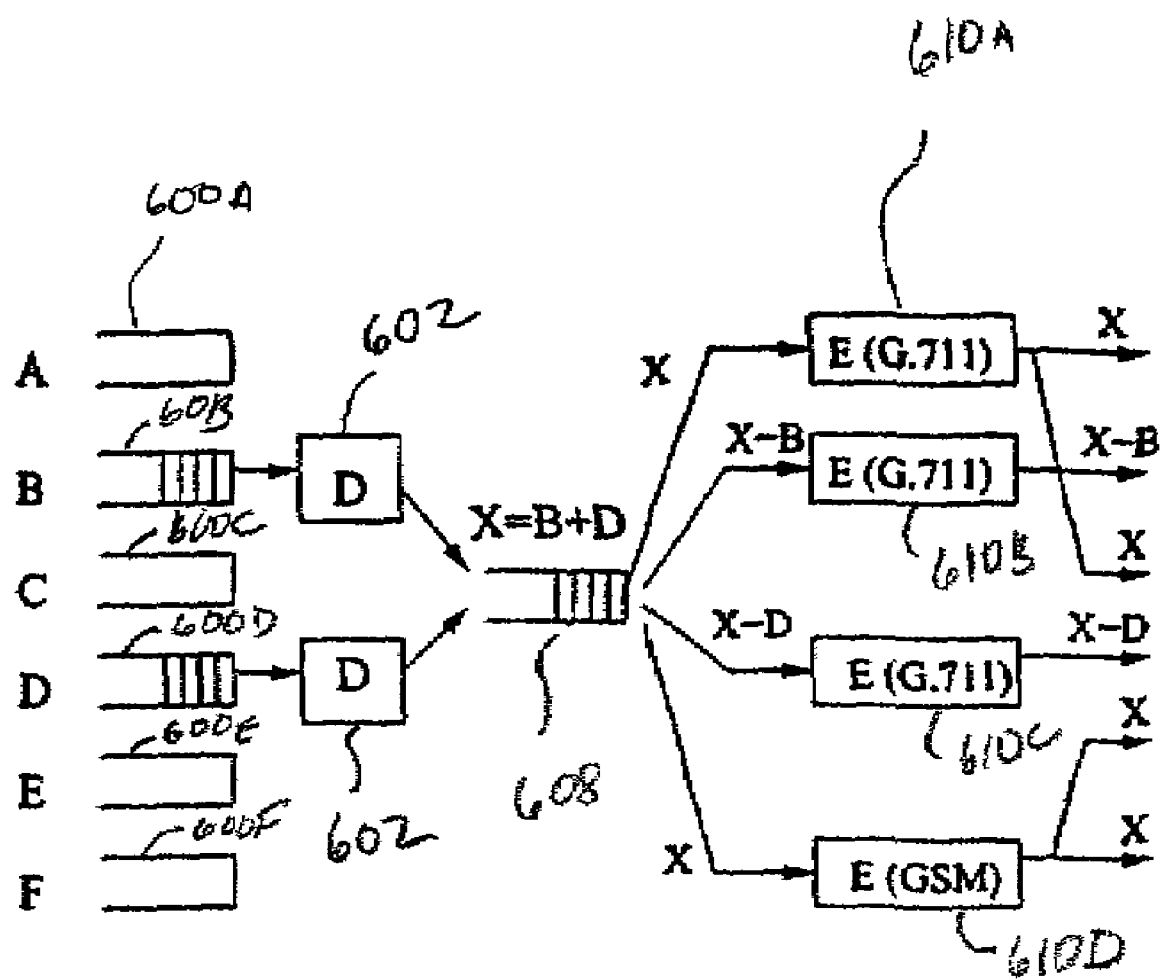
FIG. 6 is a flow diagram further illustrating the operation of the media conferencing module of FIG. 4.

FIG. 6 is a flow diagram illustrating an example of the operation of an embodiment of the media conferencing module which groups participants of a conference supporting like protocols together to optimize encoder operations. In FIG. 6, there are six participants, A-F, respectively. Participants A-D support a first CODEC protocol, G.711, whereas participants E, F, support a second CODEC protocol, GSM. Participants B and D are active participants, as illustrated by the partitions shown in queues 600B and 600D whereas participants A, C, E and F are inactive listeners at the moment of interest, as illustrated by empty queues 600A, 600C, 600E and 600F.

The audio streams from participants B and D are decoded by G.711 decoders 602 and are then mixed to form aggregate audio stream, X=B+D. The mixer/encoder processing block recognizes that listeners A and C have a common protocol (G.711) and that listeners E and F also share a common protocol (GSM). Thus rather than separately encoding stream X for A and C, the G.711 encoder can be invoked a single time for stream X and the encoded aggregate stream forwarded to participants A and C. Similarly, the GSM encoder can be invoked once for the stream X and the encoded aggregate stream forwarded to participants E and F.

For each active participant, that participant's own audio is removed from the aggregate stream prior to encoding. Thus, for participant B, the participant stream X-B is generated, encoded and transmitted to participant B. Similarly, the participant stream X-D is generated, encoded and transmitted to participant D. The advantage in this processing is that for the six participants, only four encoding operations are required. For large conferences, which generally include a larger number of listeners as compared to the number of active participants, this becomes a significant advantage.

It will be appreciated that while shown in the figures as functional blocks, the functions referred to can be implemented in computer hardware, software or a combination of such embodiments. It is expected that the most common implementations will be implemented in software written for conventional computer platforms that are commonly used for computer server applications, such as high speed IBM compatible computers operating with a known operating system, such as Windows NT®, Linux®, Unix® operating system or the like. It is well known that such software is stored and transported on computer readable media, such as computer hard disk drives, CD-ROM optical devices, computer read only memory (ROM) and the like which configures a computer to perform in accordance with the program. Examples of suitable computer program listings for such functional blocks are set forth in the computer programs listings in the compact disk appendix filed herewith.

The invention has been described in connection with certain preferred embodiments thereof. It will be appreciated that those skilled in the art can modify or alter such embodiments without departing from the scope and spirit of the invention which is set forth in the appended claims.

What is claimed is:

1. A conferencing server for establishing multi-party call conference services in a data network telephony system, comprising:

a session initiation protocol (SIP) signaling interface; and a media conferencing module, the media conferencing module comprising:

a plurality of selectable media decoders;

a plurality of media stream queues selectively coupled to said plurality of media decoders;

a jitter correction processor, the jitter correction processor compensating arrival time jitter in the data stored in the media stream queues;

a mixer, the mixer receiving the jitter corrected data from each of the queues, generating an aggregate conferencing stream of all active participants, and generating individual participant conference streams for each active participant in the conference; and a plurality of selectable media encoders, the selectable media encoders being selectively coupled to the individual participant conference streams in accordance with a protocol supported by the respective participant;

wherein the media conferencing module determines at least one media CODEC protocol supported by each conference participant, wherein the selectable media decoders are configured in accordance with said media CODEC protocols, wherein the media conferencing module determines a minimum set of media CODEC protocols supported by the inactive participants in the conference, and wherein for each media CODEC protocol in the minimum set, at least one of said selectable media encoders is configured to encode the aggregate conferencing stream.

2. The conferencing server of claim 1, wherein the individual participant conference streams are formed by subtracting a corresponding active participant audio stream from the aggregate conferencing stream.

3. The conferencing server of claim 1, wherein the media CODEC protocols are determined in accordance with SIP INVITE request messages received from conference participants via the SIP signaling interface.

4. The conferencing server of claim 1, wherein the jitter correction processor takes the form of a dynamic play-out delay algorithm.

5. The conferencing server of claim 1, further comprising a SIP to H.323 protocol gateway interface operatively coupled to the media conferencing module.

6. The conferencing server of claim 1, further comprising a SIP to PSTN protocol gateway interface operatively coupled to the media conferencing module.

7. A method of conferencing a plurality of conference participant audio streams comprising:

identifying at least one media CODEC protocol for each conference participant;

decoding each audio stream in accordance with a corresponding identified CODEC protocol;

compensating each decoded audio stream for arrival time jitter;

mixing each of the audio streams into an aggregate audio stream;

for each active participant, subtracting that participant's audio stream from the aggregate audio stream to generate a corresponding participant conference stream;

encoding each participant conference stream in accordance with an identified CODEC protocol for the participant;

delivering the encoded participant conference streams to the corresponding participants;

identifying the CODEC protocols supported by each inactive participant in the conference;

identifying a minimum set of CODEC protocol's for the inactive participant's in the conference; and for each CODEC protocol in the minimum set of CODEC protocols, encoding the aggregate audio stream in accordance with the selected protocol and distributing the encoded aggregate audio stream to those inactive participant's supporting the respective CODEC protocol.

8. The method of conferencing according to claim 7, wherein the steps of identifying CODEC protocols further comprise receiving a SIP INVITE request from each of the conference participants identifying those protocols supported by the conference participants.

9. The method of conferencing according to claim 7, wherein the step of compensating for arrival time jitter further comprises the use of a dynamic play-out delay algorithm.

10. Computer readable media programmed to configure a computer to perform a method of conferencing a plurality of conference participant audio streams, the computer operation comprising:

identifying at least one media CODEC protocol for each conference participant;

decoding each audio stream in accordance with a corresponding identified CODEC protocol;

compensating each decoded audio stream for arrival time jitter;

mixing each of the audio streams into an aggregate audio stream;

for each active participant, subtracting that participant's audio stream from the aggregate audio stream to generate a corresponding participant conference stream;

encoding each participant conference stream in accordance with an identified CODEC protocol for the participant;

delivering the encoded participant conference streams to the corresponding participants;

identifying the CODEC protocols supported by each inactive participant in the conference;

identifying a minimum set of CODEC protocol's for the inactive participant's in the conference; and for each CODEC protocol in the minimum set of CODEC protocols, encoding the aggregate audio stream in accordance with the selected protocol and distributing the encoded aggregate audio stream to those inactive participant's supporting the respective CODEC protocol.

11. The computer readable media of claim 10, wherein the steps of identifying CODEC protocols further comprise receiving a SIP INVITE request from each of the conference participants identifying those protocols supported by the conference participants.

12. The computer readable media according to claim 10, wherein the step of compensating for arrival time jitter further comprises the use of a dynamic play-out algorithm.

* * * * *